US010070378B2

United States Patent
Fornoles, Jr.

(10) Patent No.: US 10,070,378 B2
(45) Date of Patent: Sep. 4, 2018

(54) STEERING INHERENTLY AUTONOMOUS WIRELESS DEVICES TO ACCESS POINTS BASED ON MIMO (MULTIPLE INPUT/ MULTIPLE OUTPUT) CAPABILITIES OF NETWORK COMPONENTS

(71) Applicant: MERU NETWORKS, Sunnyvale, CA (US)

(72) Inventor: Teodoro Fornoles, Jr., San Ramon, CA (US)

(73) Assignee: Fortinet, Inc., Sunnyvale, CA (US)

( * ) Notice: Subject to any disclaimer, the term of this patent is extended or adjusted under 35 U.S.C. 154(b) by 80 days.

(21) Appl. No.: 14/481,914

(22) Filed: Sep. 10, 2014

(65) Prior Publication Data

US 2015/0230231 A1    Aug. 13, 2015

Related U.S. Application Data

(60) Provisional application No. 61/936,873, filed on Feb. 7, 2014.

(51) Int. Cl.
*H04W 48/20* (2009.01)
*H04B 7/0452* (2017.01)
*H04W 28/08* (2009.01)

(52) U.S. Cl.
CPC .......... *H04W 48/20* (2013.01); *H04B 7/0452* (2013.01); *H04W 28/08* (2013.01)

(58) Field of Classification Search
CPC ........... H04W 72/048; H04W 72/0486; H04W 48/20; H04W 28/08; H04B 7/0413
See application file for complete search history.

(56) References Cited

U.S. PATENT DOCUMENTS

2005/0208956 A1\* 9/2005 Takagi .............. H04W 74/0816
455/464
2007/0223423 A1\* 9/2007 Kim ..................... H04B 7/0417
370/334

(Continued)

*Primary Examiner* — Gennadiy Tsvey
(74) *Attorney, Agent, or Firm* — Law Office of Dorian Cartwright

(57) ABSTRACT

Network devices are steered based on VHT (very high throughput) capabilities, a first radio of the plurality of radios is assigned to MU-MIMO (multiple user-multiple input/multiple output) communication. The first radio is capable of communication using MU-MIMO and is backward-compatible for communication using SU-MIMO (single user-multiple input/multiple output). A second radio of the plurality of radios is assigned to SU-MIMO communication. A connection request is received from a network device. A VHT capability of the network device is determined. The VHT capability is based on whether the network device is able to communicate using an MU-MIMO radio. Responsive to a determination that the network device is capable of MU-MIMO communication, the network device is matched to a radio capable of MU-MIMO communication. Responsive to a determination that the network device is not capable of MU-MIMO communication, the network device is matched to a radio capable of SU-MIMO communication. Transmissions are conducted between the network device and the matched radio according to the VHT capability.

14 Claims, 9 Drawing Sheets

(56) References Cited

U.S. PATENT DOCUMENTS

| | | | |
|---|---|---|---|
| 2009/0080388 A1* | 3/2009 | Rohfleisch | H04B 7/024 370/338 |
| 2009/0141691 A1* | 6/2009 | Jain | H04W 88/10 370/338 |
| 2011/0116401 A1* | 5/2011 | Banerjea | H04W 74/0816 370/252 |
| 2011/0188487 A1* | 8/2011 | Seok | H04W 16/26 370/338 |
| 2011/0188587 A1* | 8/2011 | Zhang | H04L 5/0053 375/260 |
| 2011/0194427 A1* | 8/2011 | Shirota | H04W 36/0022 370/252 |
| 2012/0106371 A1* | 5/2012 | Abraham | H04B 7/0452 370/252 |
| 2013/0188628 A1* | 7/2013 | Lee | H04W 48/16 370/338 |
| 2013/0265907 A1* | 10/2013 | Kim | H04L 5/0064 370/254 |
| 2014/0086156 A1* | 3/2014 | Kirchenbauer | H04W 72/1215 370/329 |
| 2014/0269370 A1* | 9/2014 | Dharanipragada | H04W 24/02 370/252 |
| 2014/0313901 A1* | 10/2014 | Yacovitch | H04W 28/12 370/236 |
| 2015/0049680 A1* | 2/2015 | Jeffery | H04W 74/0816 370/329 |

\* cited by examiner

STEERING INHERENTLY AUTONOMOUS WIRELESS DEVICES TO ACCESS POINTS BASED ON MIMO (MULTIPLE INPUT/MULTIPLE OUTPUT) CAPABILITIES OF NETWORK COMPONENTS

CROSS-REFERENCES TO RELATED APPLICATIONS

This application claims priority under 35 U.S.C. 19(e) to U.S. Patent App. No. 61/936,873, filed Feb. 7, 2014, entitled Steering Inherently Autonomous Wireless Devices To Access Points Based on MIMO (Multiple Input/Multiple Output) Capabilities of Network Components, by Teodoro Fornoles, Jr., the contents of which are being hereby incorporated by reference in its entirety.

FIELD OF THE INVENTION

The invention relates generally to computer networking, and more specifically, to steering network devices to connect with preferred access points based on MIMO (multiple input/multiple output) capabilities of network components.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the ever-improving protocols are widely adopted in wireless devices such as laptop computers, tablet computers, smart phones, and network appliances. A new innovation in the Wave 2 version of IEEE 802.11ac allows multiple users to simultaneously connect in parallel with a MIMO radio.

Wireless devices complying with standards such as IEEE 802.11 have control over how a connection to a wireless network is made. Namely, a wireless device selects an access point among a number of access points within range that have sent out beacons advertising a presence. The beacon includes a BSSID (Basic Service Set IDentifier) as an identifier of the access point. In turn, the wireless device sends data packets which include the BSSID of the intended access point. Access points receiving a transmission intended for a different access point, as determined by the BSSID, merely ignore the data packets.

Problematically, wireless devices act in self-interest and without consideration for burdens or capabilities of an access point or other components in a wireless network, or other conditions affecting the wireless network. In fact, wireless devices, being unaware of network conditions, can also make a connection against their own best interest when a more capable access point is within range and available. Ultimately, the lack of information given to a decision-making device is an inherent weakness of IEEE 802.11 and other network protocols.

Installing a client or app to execute on a wireless device is not always a desirable solution. For instance, guests connecting to a public hot spot for only one time would be burdened with the process of downloading and installing a client. Furthermore, many computer users are weary about malicious applications downloaded from the Internet. Finally, the client is another background process consuming processing and memory availability of wireless devices.

Furthermore, access points having new capabilities under the Wave 2 version of the IEEE 802.11 ac standard are backwards compatible with the Wave 1 version of IEEE 802.11ac. The Wave 2 standard allows multiple users to simultaneously connect with a MIMO radio of an access point in a parallel manner as an improvement over the Wave 1 standard which serves a single user with the MIMO radio in a series manner.

Unfortunately, when a self-interested wireless device operating under Wave 1 transmits through an access point, the access point reverts to Wave 1 operation. Consequently, other Wave 2 capable wireless devices have to wait until the Wave 1 wireless device is no longer transmitting or receiving in order for the access point to return to Wave 2 operations, or for a turn in line under continued Wave 1 operations. This problem will continue as long as wireless devices having capabilities under Wave 1 devices and Wave 2 are autonomously connecting to access points having capabilities under Wave 1 and Wave 2.

What is needed is a technique to optimize Wave 2 MU-MIMO (multiple user-multiple input/multiple output) communication by steering autonomous network devices to connect with preferred radios and access points based on capabilities of network components. Further, the technique should be adaptable to be implemented from an access point in communication with wireless devices, or from an access point level in communication with other access points, or from a controller level in communication with a plurality of access points.

SUMMARY

These shortcomings are addressed by the present disclosure of methods, computer program products, and systems to steer wireless devices to preferred access points based on capabilities of network components.

In an embodiment, a first radio of the plurality of radios is assigned to MU-MIMO (multiple user-multiple input/multiple output) communication. The first radio is capable of communication using MU-MIMO and is backward-compatible for communication using SU-MIMO (single user-multiple input/multiple output). A second radio of the plurality of radios is assigned to SU-MIMO communication.

A connection request is received from a network device. A VHT (very high throughput) capability of the network device is determined. The VHT capability is based on whether the network device is able to communicate using an MU-MIMO radio. Responsive to a determination that the network device is capable of MU-MIMO communication, the network device is matched to a radio capable of MU-MIMO communication. Responsive to a determination that the network device is not capable of MU-MIMO communication, the network device is matched to a radio capable of SU-MIMO communication. Transmissions are conducted between the network device and the matched radio according to the VHT capability.

Advantageously, MU-MIMO communication is not disrupted by backwards-compatible SU-MIMO communication on a radio or an access point. Also, network bandwidth is optimized.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems to steer wireless devices to preferred access points (or other devices) based on MIMO (multiple input/multiple output) capabilities of network components. For example, IEEE 802.11, Wave 1 SU-MIMO (single user-multiple input/multiple output) network devices can be steered to an access point dedicated for Wave 1 clients so as not to slow down Wave 2 MU-MIMO (multiple user-multiple input/multiple output) network devices, or for other reasons (e.g., network conditions). Further, Wave 1 clients can be steered to a particular radio of an access point dedicated to Wave 1 clients and having other radios dedicated to Wave 2 clients. One of ordinary skill in the art will recognize that many other scenarios are possible, as discussed in more detail below.

Figure 1A:
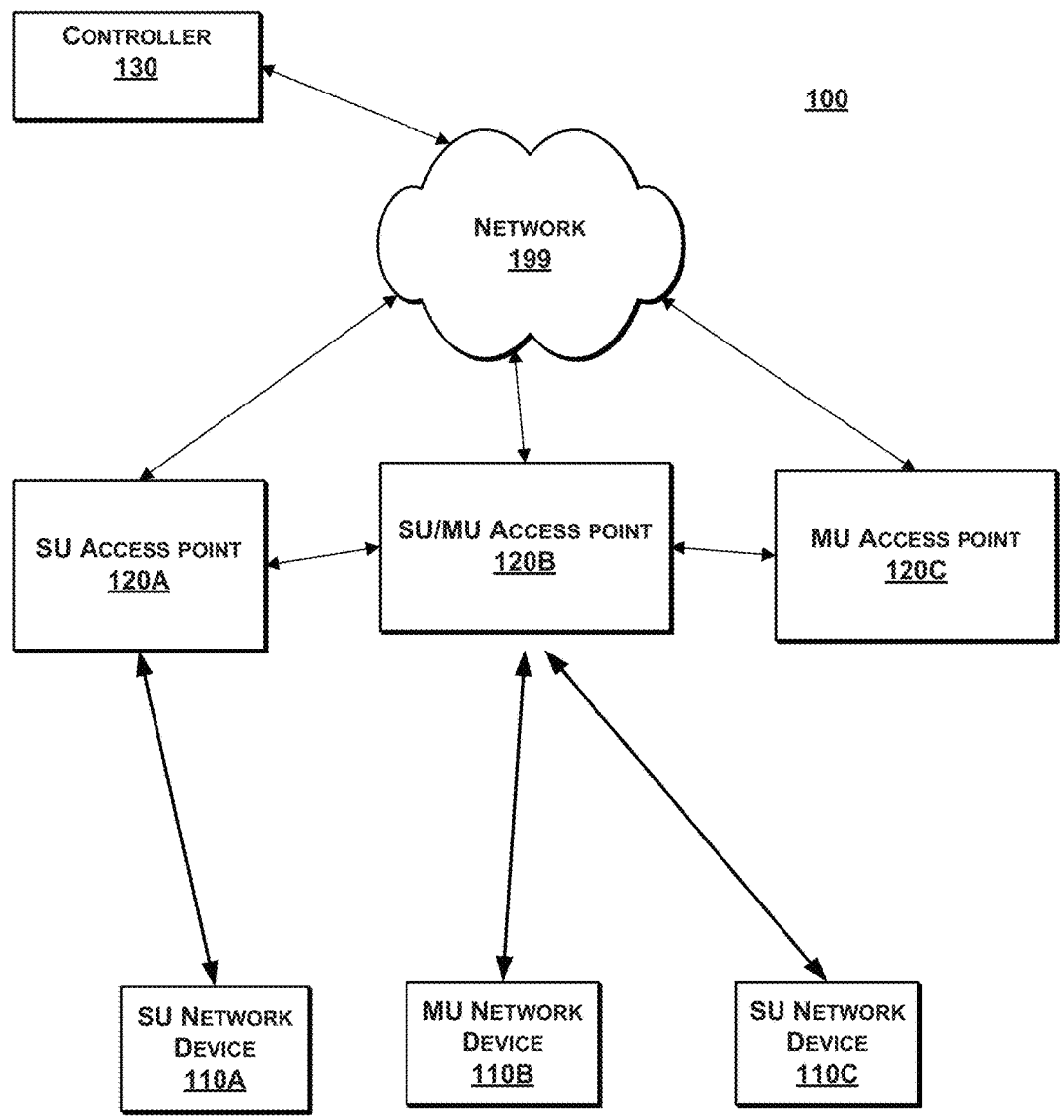
FIG. 1A is a high-level block diagram illustrating a system to steer wireless devices based on MIMO (multiple input/multiple output) capabilities of network components, according to one embodiment.
Figure 1B:
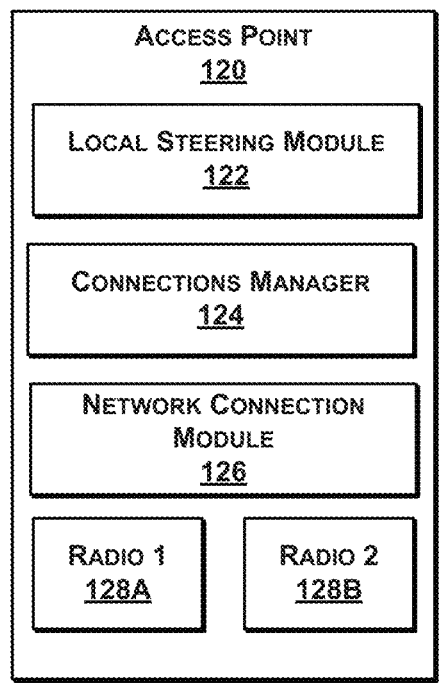
FIG. 1B is a more detailed block diagram illustrating an access point of the system of FIG. 1A, according to one embodiment.
Figure 1C:
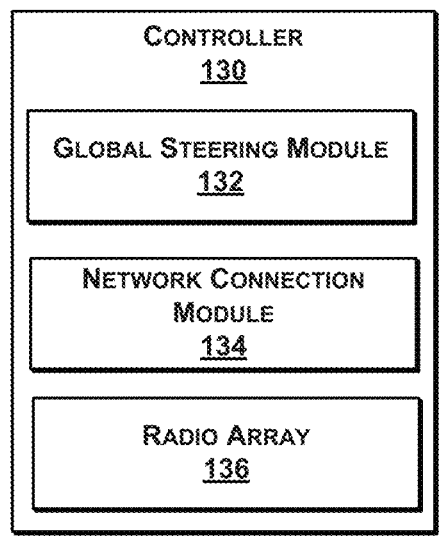
FIG. 1C is a more detailed block diagram illustrating an controller of the system of FIG. 1A, according to one embodiment.

Systems to Steer MIMO Network Device Connections (FIGS. 1A-C)

FIG. 1A is a high-level block diagram illustrating a system 100 to steer network devices based on MIMO capabilities, according to one embodiment. The system 100 includes access points 120A-C coupled to wireless devices (or stations) 110A-C and also coupled to a network 199 (e.g., a LAN, WAN, the Internet, a cloud-based network, a data network, a cellular network, a hybrid network, or the like). More specifically, system 100 includes three types of access points: an SU access point 120A, an SU/MU access point 120B and an MU access point 120C (collectively referred to as access points A-C). The access points 120A-C are representative only, and other embodiments can include only one device, or more than one type of each device. Further, an individual access point can be partitioned to be split-brained, in that one partition operates as one type of access point (e.g., SU/MU type access point) and another partition operates as a different type of access point (e.g., MU type access point). Similarly, system 100 includes two types of wireless devices: SU network devices 110A and C, and an MU network device 110B (collectively referred to as wireless devices 110A-C), which are also representative of one or more devices.

The access points 120A-120C include one or more individual access points that interact with wireless devices 110A-110C to control medium access. An individual access point can be any of the computing devices described herein (also see generally, FIG. 6). For example, the access points 120A-120C can be an AP (modified as discussed herein) by Meru Networks of Sunnyvale, Calif. Each access point 120A-120C is preferably connected to the network 199 (e.g., gateway, switch, router, hub, or another access point that is connected to the network 199) via a wired connection, but in some embodiments, such as a mesh network, the uplink connection is wireless. The access points 120A-120C can be set-up in various configurations to provide wireless coverage areas. In another embodiment, the functionality is incorporated into a switch or router.

In operation, the SU access point 120A is capable of Wave 1 MIMO functionality to serve single clients in series, the MU access point 120C is capable of the improved Wave 2 MIMO functionality to serve multiple clients in parallel, and the SU/MU access point 120B is capable of both Wave 1 MIMO and Wave 2 MIMO functionalities. The SU/MU access point 120B, in one embodiment switches modes between Wave 1 and Wave 2 automatically as indicated by the controller 130, current needs of wireless devices. In another embodiment, specific radios are dedicated to Wave 1 MIMO while other radios are dedicated to Wave 2 MIMO. More generally, the access points 120A-C broadcast beacons with a BSSID (Basic Service Set IDentifier) to advertise a presence over a corresponding range. In some embodiments, one BSSID is used for the entire system 100, and in other embodiments, several BSSIDs are available. Under the latter embodiment, some BSSIDs can be reserved for Wave 1 client while other BSSIDs are reserved for Wave 2 clients. A probe request is received from wireless devices 110A-C that have selected a particular access point for connection. The access points 120A-C determine whether to allow a connection or to steer towards a different access point. Further, steering can be to a particular radio (at the same access point or at a different access point). Decisions can be made autonomously by an access point, or in combination with a controller or with coordination between the other access points (e.g., through a dedicated communication channel). Steering can be implemented by various techniques, such as continually refusing a connection, by the controller 130 directing which access point should respond to communications of a particular wireless station while others ignore the same communications, by limiting BSSID beacons advertised, or more explicitly through a list of available access points.

Figure 6:
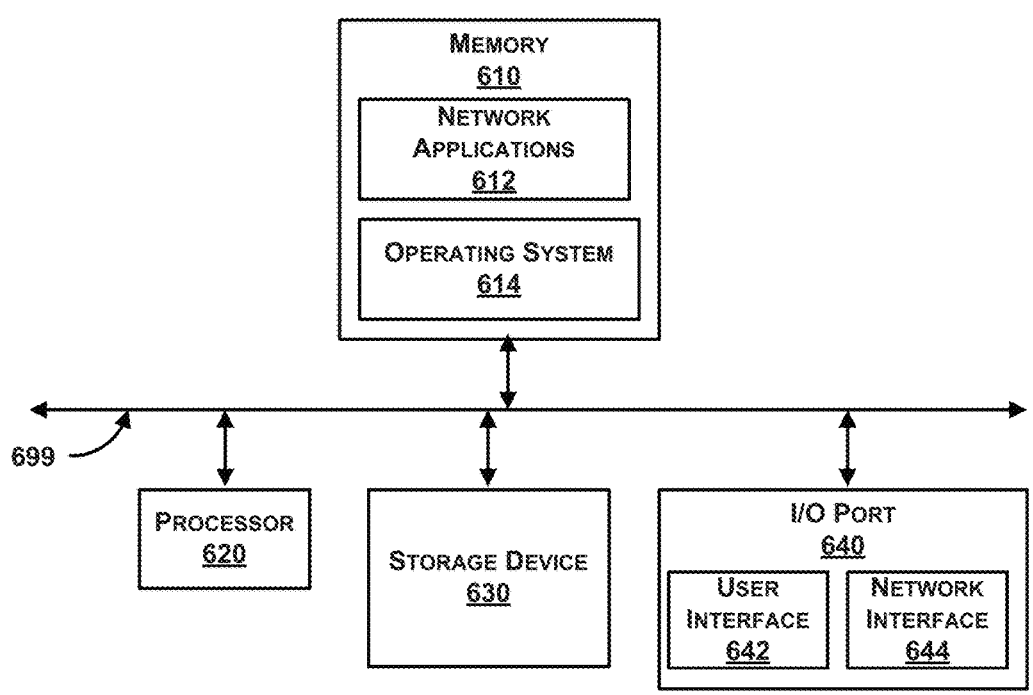
FIG. 6 is a block diagram illustrating an exemplary computing device of the FIG. 1A system, according to one embodiment.

The wireless devices 110A-C can be, for example, a personal computer, a laptop computer, a tablet computer, a smart phone, a mobile computing device, an Internet appliance, a non-wireless device modified to have wireless capabilities, or any other computing device (see generally, FIG. 6). A wireless device wirelessly coupled to an access point using a radio of various protocols. No pre-configuration or client is needed, in an embodiment, but applications can be downloaded or operating systems can be patched for optimized compatibility. Typically, the wireless devices 110A-C choose an access point for connection, but in some embodiments of the system 100, it is the access points 120A-C (or controller 130) that direct the wireless devices 110A-C to a particular access point. Conditions associated with the network device can affect the preference. For example, conditions can include: whether the access point is Wave 1 and/or Wave 2 capable, whether the network device is Wave 1 and/or Wave 2 compatible, an RSSI (Received Signal Strength Indicator), a distance from a particular access point, connection history, a user of the network device, a type of traffic, quality of service, a time element, and the like can cause a network device to be steered away from certain access point and towards others.

In an optional embodiment, a controller 130 (e.g., an MC1500 or MC6000 device by Meru Networks of Sunnyvale, Calif. as described in U.S. application Ser. No. 13/426,703 filed Mar. 22, 2012 and commonly-assigned, and hereby incorporated by reference) provides centralized management for access points. The controller 130 can manage which of the access points 120A-C respond to any of the wireless devices 110A-C. A look-up table can maintain associations between access points, BSSIDs, and wireless devices. As a result, the controller 130 can assist by, for example, determining how to steer based on global conditions such as load, historical data, network conditions, preconfigured settings, network architecture, and the like. The controller 130 can provide many other services to the network 199 such as virtual cell and virtual port functionalities (also described in U.S. application Ser. No. 13/426, 703).

FIG. 1B is a more detailed block diagram illustrating an access point 120 of the system 100, according to one embodiment. The access point 120 comprises a local steering module 122, a connection manager 124, a network module 126, and a radio array 128. The local steering module 122 can be passive (e.g., instructed by the controller 130), active (e.g., autonomous), or in cooperation (e.g., with the controller 130 and/or other access points) in steering wireless devices. The components can be implemented in hardware, software, or a combination of both.

FIG. 1C is a more detailed block diagram illustrating a controller 130 of the system 100, according to one embodiment. The network device 130 comprises a global steering module 132, a network connection module 134, and a radio array 136. The global steering module 132 can receive global conditions from, for example, the network as a whole, from individual access points, from a network administrator or other external resource. The global components can then be used to determine whether and how to steer wireless devices. The components can be implemented in hardware, software, or a combination of both.

Methods for Steering MIMO Network Device Connections (FIG. 2-5)

Figure 2:
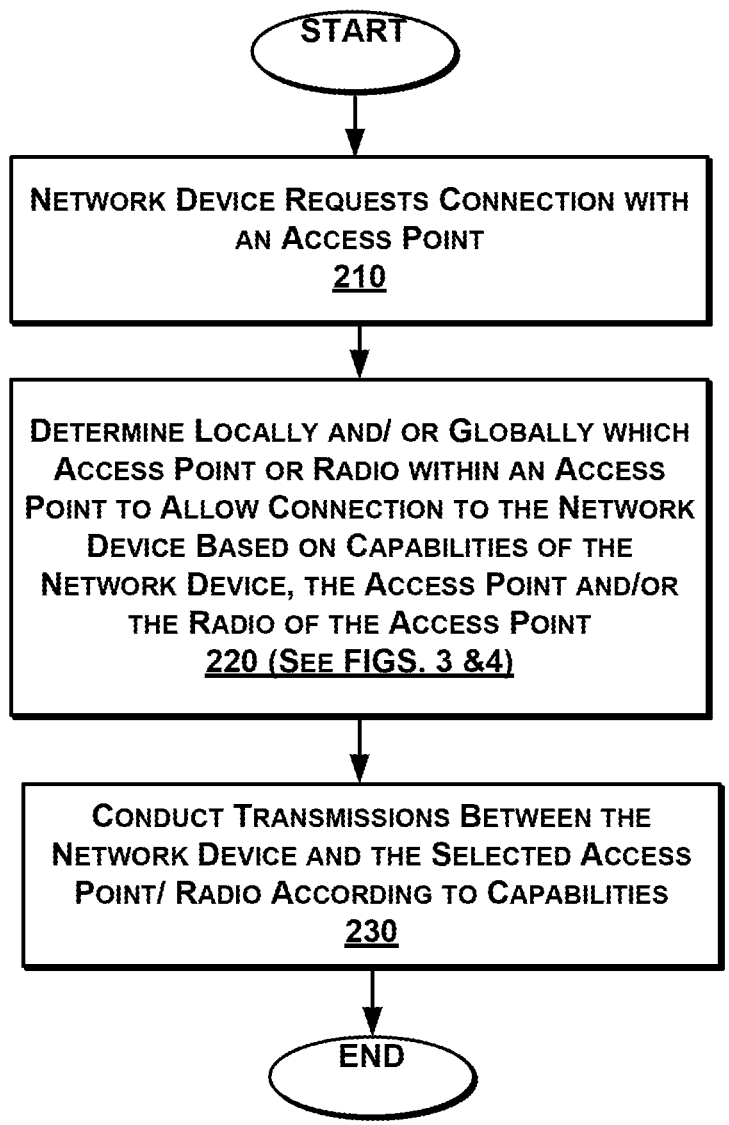
FIG. 2 is a block diagram illustrating a method for steering wireless devices based on MIMO capabilities of network components, according to one embodiment.

FIG. 2 is a block diagram illustrating a method 200 for steering network devices based on MIMO capabilities of network components, according to one embodiment. For example, the method 200 can be implemented in the system 100 or a modification thereof. The method 200 can include additional steps or more detailed sub-steps, and one of ordinary skill in the art will recognize that the principles of the current disclosure still apply.

At step 210, a network device requests a connection with an access point. The request can include a MIMO capability of the network device for SU-MIMO or MU-MIMO transmissions under IEEE 802.11 ac Wave 1 or Wave 2, respectively. The capability can be explicitly provided or implicitly derived. In other embodiments, network devices are actively interrogated to determine capabilities. In still other embodiments, capabilities are preconfigured in an access point or a controller through previous connections or manually by a network administrator.

Figure 4A:
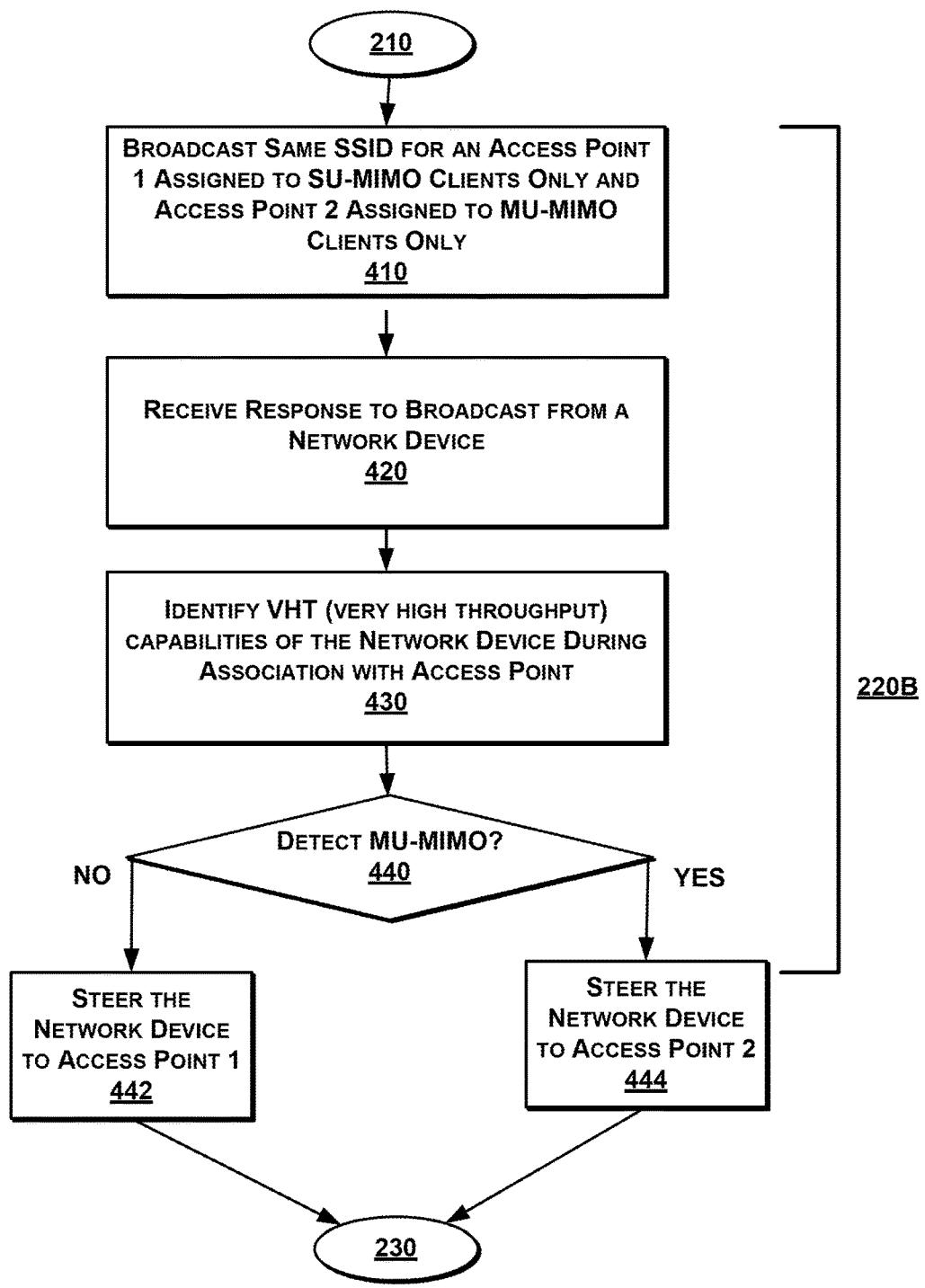
FIG. 4A is a block diagram illustrating a method 400 in an access point for steering network devices to a specific access point of multiple access points based on capabilities of the network devices and the specific access point, according to one embodiment.
Figure 4B:
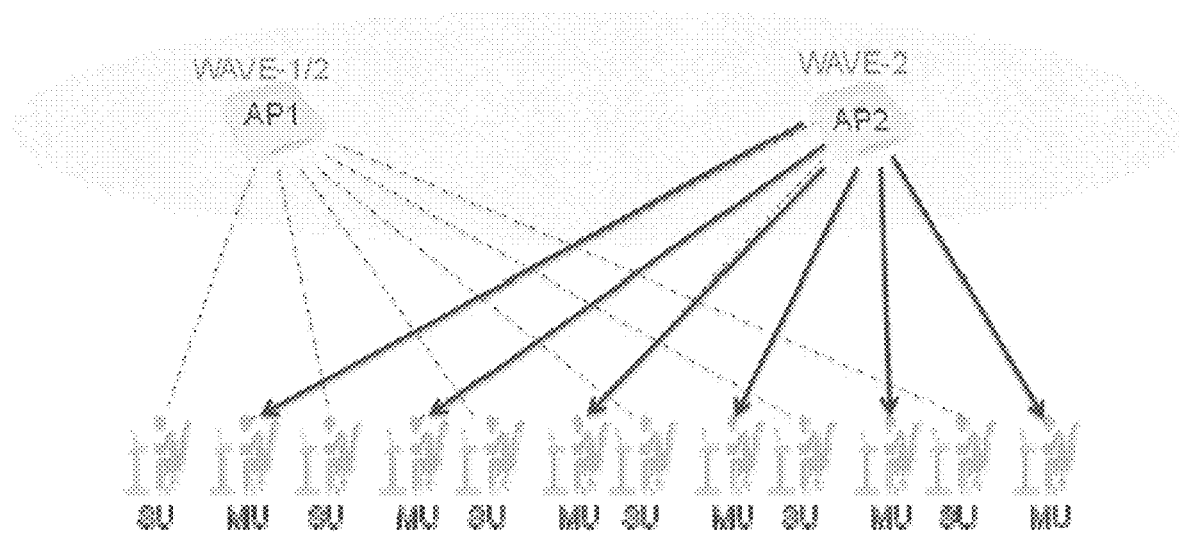
FIG. 4B is a schematic diagram illustrating how multiple network devices have been steered to specific access points based on capabilities, according to one embodiment.
Figure 5:
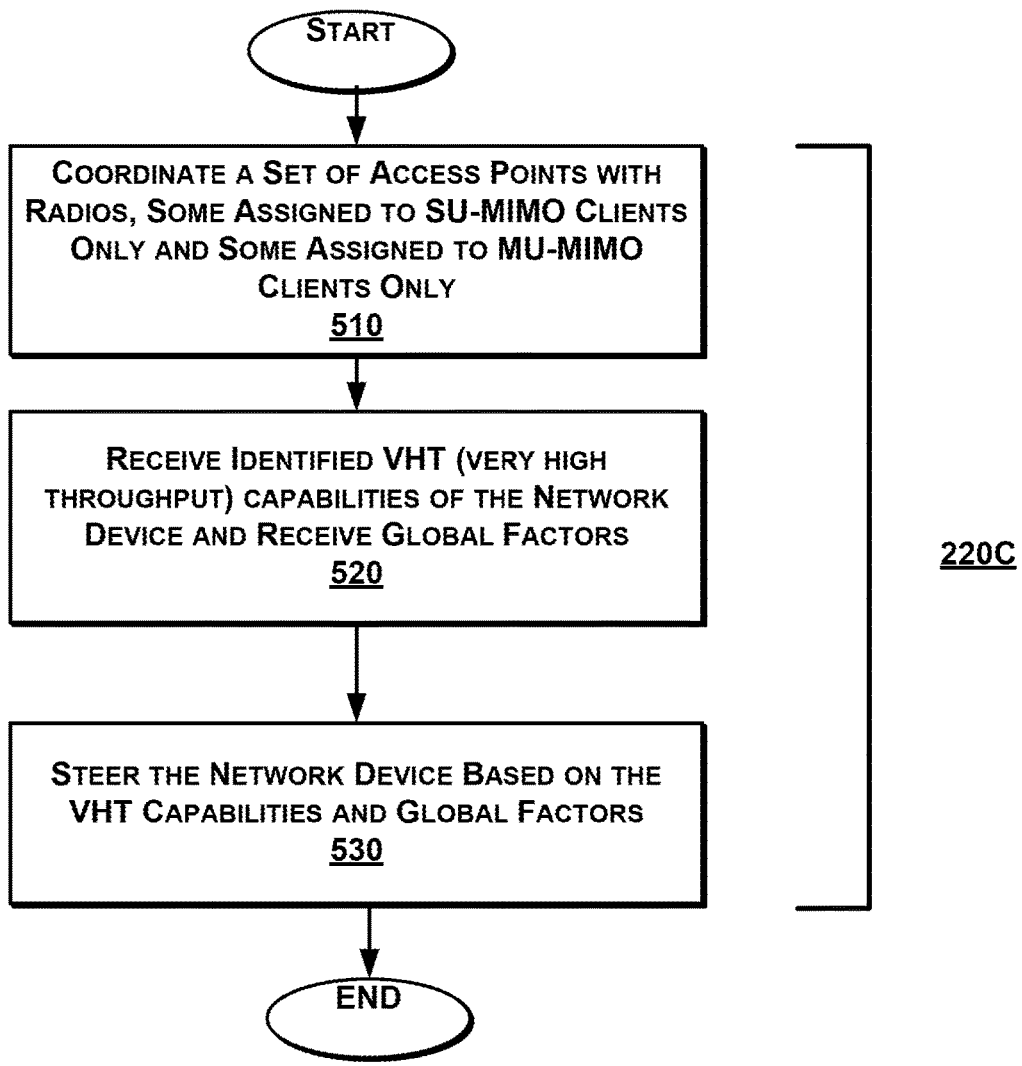
FIG. 5 is a block diagram illustrating a method in a controller for steering network devices to a specific radio or to a specific access point based on capabilities of the network devices and the specific access point, according to one embodiment.

At step 220, either locally or globally, it is determined which access point (or optionally, which radio therein) will connect to the network device requesting a connection. The access points (and radios) can either be assigned to handle Wave 1 or Wave 2 connections. An access point can also have one radio to handle Wave 1 and a second radio to handle Wave 2 connections. Local determinations are made at an access point level. The local determinations can be implemented in network architectures in which access points operate autonomously without centralized management or even when offloaded by a centralized controller. In one embodiment, local determinations can also take into account known information about the network. In another embodiment, local determinations can be partly guided by a controller that communicates with multiple access points. In yet another embodiment, global determinations are directed by a controller taking into account conditions across multiple access points and corresponding network devices. Various implementations of determinations are illustrated and described below in association with FIGS. 3-5 (i.e., FIGS. 3A-B show radio steering, FIGS. 4A-B show access point steering, and FIG. 5 shows controller-based steering).

In step 230, transmissions with the network device are conducted according to a selected access point/radio. A look-up table at an access point or at a controller can be maintained so that when frames are received from a network device, the frame can be directed accordingly. Alternatively, a network device can be aware of a specific radio or access point that has been assigned for communication, and frames can be addressed accordingly.

Figure 3A:
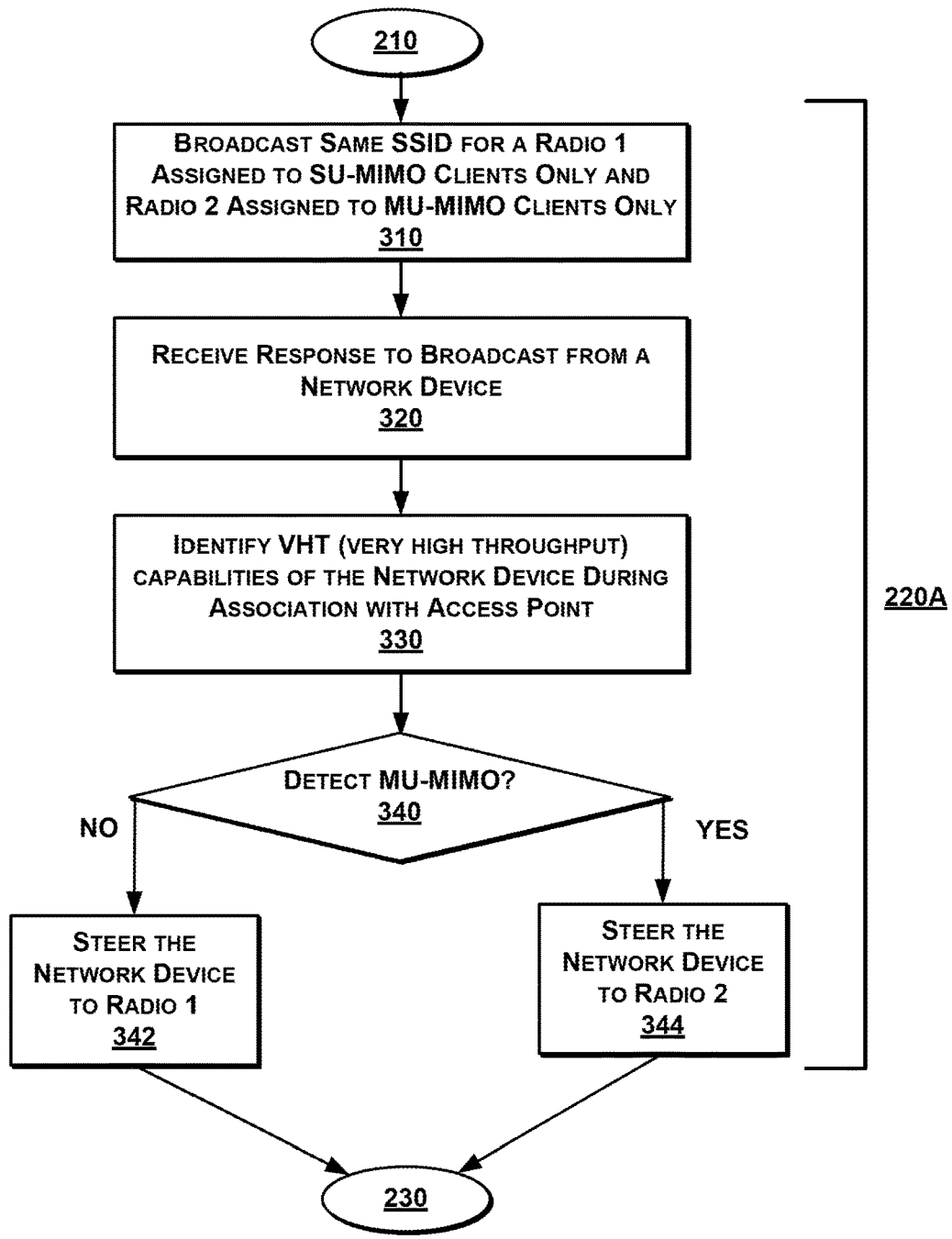
FIG. 3A is a block diagram illustrating a method 300 in an access point for steering network devices to a specific radio of multiple radios based on capabilities of the network devices and the specific radio, according to one embodiment.
Figure 3B:
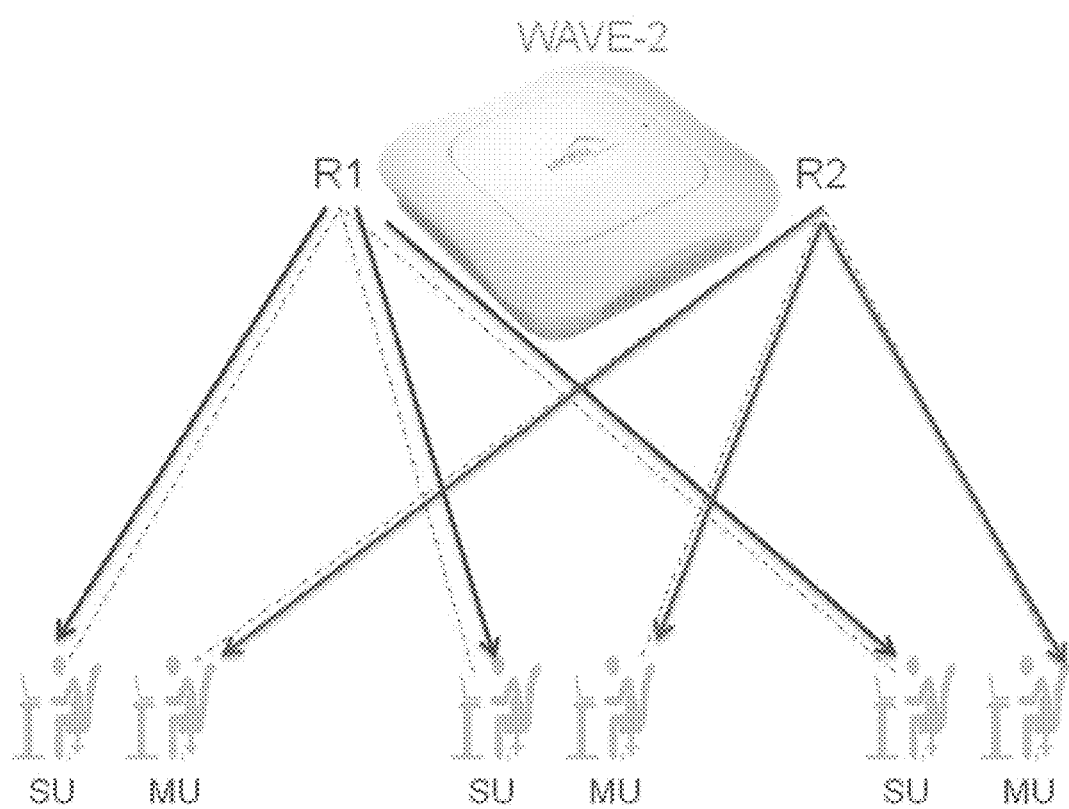
FIG. 3B is a schematic diagram illustrating how multiple network devices have been steered to specific radios based on capabilities, according to one embodiment.

FIG. 3A is a block diagram illustrating a method 220A in an access point for steering network devices to a specific internal radio of multiple radios based on capabilities of the network devices and the specific radio, according to one embodiment.

At step 310 of FIG. 3A, the same SSID is broadcast for multiple radios having different capabilities. For example, as shown in FIG. 3B, a first radio using the SSID can be assigned to SU-MIMO clients only, while a second radio using the same SSID can be assigned to MU-MIMO clients only. Returning to FIG. 3A, at step 320, a response to the SSID broadcast is received from a network device.

At step 330, a VHT (very high throughput) capability of the network device is identified during association with the access point, in some embodiments. To do so, IEEE 802.11 packets are inspected using various techniques. For example, at a PHY layer of a network frame received from the network device, a Group ID of 6 bits identifies the corresponding payload as being single-user or multi user. Also, there are packet format differences in the VHT-SIG-A1 field and the VHT-SIG-A2 field, including a number of space-time streams for users, multi-user coding, and the like. Alternatively, the network device can be interrogated for reporting of capability, or for implicit identification from characteristics such as operating system and type of radio. Additionally, a network administrator can manually configure capability. Other techniques from MIMO capability identification are possible.

At step 340, if a MU-MIMO type of VHT capability is detected, the network device is steered to radio 2 at step 344. Otherwise, an SU-MIMO type of VHT capable network device is steered to radio 1 at step 342. In some embodiments, additional factors influence steering decisions, such as QoS, throughput, load balancing, time of day, other network device characteristics, and the like. Furthermore, radio assignments can be dynamically updated to reflect changing conditions, for example, when new radios added or removed. Steering conditions can be manually overridden by a network administrator. Advantageously, radio 2 is reserved for MU-MIMO communication without being interrupted for backwards-compatible SU-MIMO communication. In another embodiment, if more than one SU-MIMO radios or more than one MU-MIMO radios are available, further criteria can be used to steer between the same type radios (e.g., load balancing, pre-configuration, RSSI, and the like).

FIG. 4A is a block diagram illustrating a method 220B in an access point for steering network devices to a specific access point of multiple access points based on capabilities of the network devices and the specific access point, according to one embodiment.

At step 410, the same SSID is broadcast for multiple access points. For example, as shown in FIG. 4B, a first access point using the SSID can be assigned to SU-MIMO clients only, while a second access point using the same SSID can be assigned to MU-MIMO clients only. Network devices, although inherently autonomous under the IEEE 802.11 protocols, are controlled by the network. In more detail, network devices choose an SSID from the choices provided from network controls, unaware which access point will be assigned for communication. Without knowledge or reconfigurations of network devices, network controls are able to change access point assignments for network devices, while communication continues seamlessly. Returning to FIG. 4A, at step 420, a response to the SSID broadcast is received from a network device.

At step 430, a VHT capability of the network device is identified during association with the access point. In response, at step 340, the network device is steered to the first access point at step 442, or the second access point at step 444, based on the VHT capabilities.

FIG. 5 is a block diagram illustrating a method 220C in a controller for steering network devices to a specific radio or to a specific access point based on capabilities of the network devices and the specific access point, according to one embodiment.

At step 510, a set of access points with radios are coordinated, for example, by a controller as show in the network architecture of FIG. 1. Some access points and/or radios are assigned to SU-MIMO clients and some are assigned to MU-MIMO clients. At step 520, an identified VHT capabilities of the network device are received. Additionally, global factors (e.g., load balancing, throughput, number of connections, time of day, QoS, and the like)' are received and can be taken into consideration by a controller in making global decisions on where to steer network devices. At step 530, a network device is steered based on the VHT capabilities and, optionally, global factors.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the wireless devices 110A-110B, the access points 120A-120B, and the controller 130. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a storage device 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of network applications or access points as illustrated in FIGS. 1B and 1C. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage device 630

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae, having Wave 1 and/or Wave 2 compatibility.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11 ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in an access point of a wireless network, for steering network connections between a plurality of radios on the access point with distinct VHT (very high throughput) capabilities for stations, wherein a first radio of the access point uses a first protocol of parallel communications, and the first protocol is inherently backward compatible with a second protocol of serial communication, the method comprising the steps of:
    receiving assignments for MU-MIMO (multiple user-multiple input/multiple output) and SU-MIMO (single user-multiple input/multiple output) services for MU-MIMO radios from a controller, wherein the controller determines assignments based on global conditions including MU-MIMO and SU-MIMO loads currently being handled by other access points in a plurality of access points;
    assigning a first radio of the plurality of radios to IEEE 802.11ac, wave 2 stations using MU-MIMO communication in a parallel manner, wherein the first radio continues to operate under IEEE 802.1 1ac, wave 2;
    assigning a second radio of the plurality of radios to dedicated to IEEE 802.11ac, wave 1 stations using SU-MIMO communication in a serial manner, wherein the second radio also continues to operate under IEEE 802.11ac, wave 2 which is inherently backward-compatible with IEEE 802.11ac, wave 1;
    receiving a connection request from a first station;
    determining a VHT capability of the first station, the VHT capability based on whether the first station is able to communicate using an MU-MIMO radio;
    responsive to a determination that the first station is VHT capable, matching the first station to the first radio for MU-MIMO communication,
    wherein responsive to a second station also determined to be VHT capable, matching the second station to the first radio for MU-MIMO communication, in a parallel manner with the first station, without waiting until the first station has completed MU-MIMO communication;
    responsive to a determination that the first station is not VHT capable, matching the first station to the second radio, the second radio operating to conduct transmissions using IEEE 802.11ac, wave 2 protocol, in a parallel manner, for dedicated SU-MIMO communication using IEEE 802.11, wave 2, and conducting transmissions in the IEEE 802.11, wave 1 in a serial manner,
    wherein responsive to the second station also determined not to be VHT capable, matching the second station to the second radio for dedicated SU-MIMO communication, in a serial manner to the first station, and waiting until the first station has completed SU-MIMO communication; and
    conducting transmissions between the first station and the matched radio according to the VHT capability.

2. The method of claim 1, wherein determining the VHT capability of the first station comprises:
    determining the VHT capability of the first station including inspecting a frame received from the first station.

3. The method of claim 1, wherein determining the VHT capability of the first station comprises:
    determining the VHT capability of the first station including receiving an indication of VHT capability from a controller in the wireless network.

4. The method of claim 1, wherein the second radio comprises an MU-MIMO communication capable radio that downlinks to provide SU-MIMO communication.

5. The method of claim 1, further comprising:
    determining that a load on the first radio assigned to MU-MIMO communication exceeds a threshold or that a throughput on the first radio is below a threshold; and
    matching the first station to the second radio for dedicated SU-MIMO communication despite MU-MIMO communication capability of the first station.

6. The method of claim 1, further comprising:
    reassigning at least one of: the first radio to SU-MIMO communications, and the second radio to MU-MIMO communications.

7. The method of claim 1, further comprising:
    associating the first radio with a first BSSID (basic service set identifier); and
    associating the second radio with a second BSSID.

8. The method of claim 1, further comprising:
    receiving the assignments of the first and second radios from a controller.

9. The method of claim 1, further comprising:
    receiving the assignments of the first and second radios from a controller, wherein the controller determines assignments based on global conditions associated with a plurality of access points managed by the controller, the plurality of access points including the access point and at least one other access point.

10. A non-transitory computer-readable medium storing instructions that when executed by an access point of a wireless network, performs a method for steering network connections between a plurality of radios on the access point with distinct VHT (very high throughput) capabilities for a network device, wherein a first radio of the access point uses a first protocol of parallel communications, and the first protocol is inherently backward compatible with a second protocol of serial communication, the method comprising the steps of:

receiving assignments for MU-MIMO (multiple user-multiple input/multiple output) and SU-MIMO (single user-multiple input/multiple output) services for MU-MIMO radios from a controller, wherein the controller determines assignments based on global conditions including MU-MIMO and SU-MIMO loads currently being handled by other access points in a plurality of access points;

assigning a first radio of the plurality of radios to IEEE 802.11ac, wave 2 stations using MU-MIMO communication in a parallel manner, wherein the first radio continues to operate under IEEE 802.1 1ac, wave 2;

assigning a second radio of the plurality of radios to dedicated to IEEE 802.11ac, wave 1 stations using SU-MIMO communication in a serial manner, wherein the second radio also continues to operate under IEEE 802.11ac, wave 2 which is inherently backward-compatible with IEEE 802.11ac, wave 1;

receiving a connection request from a first station;

determining a VHT capability of the first station, the VHT capability based on whether the first station is able to communicate using an MU-MIMO radio;

responsive to a determination that the first station is VHT capable, matching the first station to the first radio for MU-MIMO communication, wherein responsive to a second station also determined to be VHT capable, matching the second station to the first radio for MU-MIMO communication, in a parallel manner with the first station, without waiting until the first station has completed MU-MIMO communication;

responsive to a determination that the first station is not VHT capable, matching the first station to the second radio, the second radio operating to conduct transmissions using IEEE 802.11ac, wave 2 protocol, in a parallel manner, for dedicated SU-MIMO communication using IEEE 802.11, wave 2, and conducting transmissions in the IEEE 802.11, wave 1 in a serial manner, wherein responsive to the second station also determined not to be VHT capable, matching the second station to the second radio for dedicated SU-MIMO communication, in a serial manner to the first station, and waiting until the first station has completed SU-MIMO communication; and conducting transmissions between the first station and the matched radio according to the VHT capability.

11. The computer-readable medium of claim 10, wherein in the method, determining the VHT capability of the first station comprises:

determining the VHT capability of the first station including inspecting a frame received from the first station.

12. The computer-readable medium of claim 10, wherein in the method, determining the VHT capability of the first station comprises:

determining the VHT capability of the first station including receiving an indication of VHT capability from a controller in the wireless network.

13. The computer-readable medium of claim 10, wherein in the method, the second radio comprises a MU-MIMO communication capable radio that downlinks to provide SU-MIMO communication.

14. The computer-readable medium of claim 10, wherein the method further comprises:

determining that a load on the first radio assigned to MU-MIMO communication exceeds a threshold or that a throughput on the first radio is below a threshold; and matching the first station to the second radio for dedicated SU-MIMO communication despite MU-MIMO communication capability of the first station.

* * * * *